(12) United States Patent
Wu

(10) Patent No.: US 9,284,008 B2
(45) Date of Patent: Mar. 15, 2016

(54) FOLDING KICK SCOOTER

(71) Applicant: Anita Wu, Dongguan (CN)

(72) Inventor: Anita Wu, Dongguan (CN)

(\*) Notice: Subject to any disclaimer, the term of this patent is extended or adjusted under 35 U.S.C. 154(b) by 0 days.

(21) Appl. No.: 14/845,298

(22) Filed: Sep. 4, 2015

(65) Prior Publication Data
US 2015/0375821 A1 Dec. 31, 2015

(51) Int. Cl.
*B62K 15/00* (2006.01)
*B62K 3/00* (2006.01)

(52) U.S. Cl.
CPC .............. *B62K 15/006* (2013.01); *B62K 3/002* (2013.01)

(58) Field of Classification Search
CPC ....... B62K 15/006; B62K 15/00; B62K 3/002
See application file for complete search history.

(56) References Cited

U.S. PATENT DOCUMENTS

| | | | | | |
|---|---|---|---|---|---|
| 4,552,372 | A * | 11/1985 | Jones | ..................... | B62K 3/002 280/87.041 |
| 5,848,660 | A * | 12/1998 | McGreen | ............. | B62K 15/006 180/208 |
| 6,158,751 | A * | 12/2000 | Wu | ..................... | B62K 15/006 280/87.041 |
| 6,173,976 | B1 * | 1/2001 | Lee | ....................... | B62K 3/002 280/87.041 |
| 6,182,988 | B1 * | 2/2001 | Wu | ....................... | B62K 3/002 280/87.041 |
| 6,206,387 | B1 * | 3/2001 | Tsai | ....................... | B62K 3/002 16/359 |
| 6,234,501 | B1 * | 5/2001 | Chen | ........................ | C23F 1/46 16/900 |
| 6,270,095 | B1 * | 8/2001 | Chang | .................. | B62K 15/006 280/87.041 |
| 6,270,097 | B1 * | 8/2001 | Lin | ...................... | B62K 15/006 280/87.041 |
| 6,286,845 | B1 * | 9/2001 | Lin | ........................ | B62K 3/002 16/324 |
| 6,318,741 | B1 * | 11/2001 | Chen | ..................... | B62K 3/002 16/900 |
| 2005/0073121 | A1 * | 4/2005 | Chen | .................... | B62K 15/006 280/87.05 |
| 2009/0278335 | A1 * | 11/2009 | Dotsey | ...................... | B62B 7/10 280/647 |
| 2013/0167684 | A1 * | 7/2013 | Wang | .................... | B62K 15/008 74/551.4 |

(Continued)

*Primary Examiner* — Brodie Follman
*Assistant Examiner* — Brian Cassidy

(57) ABSTRACT

A folding kick scooter includes a quick release clamp on top of a head tube and including a lever; a neck having a front end secured to the head tube and including two opposite slot members; a footboard having an upwardly bent front portion pivotably secured to the neck and including two front, opposite cavities; a brake member at a rear portion of the footboard; a lock device including a seat in the neck, the seat having a through hole, and a spring biased pin through the slot members to have two ends releasably anchored in the opposite cavities respectively; a cable extending from the lever and passing through the neck and the through hole of the seat to secure to the pin; a brake member including a hole and a slot element communicating with the hole; and a lever fastening device moveably secured to the brake member.

2 Claims, 8 Drawing Sheets

(56) References Cited

U.S. PATENT DOCUMENTS

| | | | |
|---|---|---|---|
| 6,332,621 B1 * | 12/2001 | Wu | B62K 3/002 16/900 |
| 6,367,829 B1 * | 4/2002 | Lee | B62K 15/006 280/87.041 |
| 6,378,880 B1 * | 4/2002 | Lin | B62K 15/006 280/87.05 |
| 6,390,483 B1 * | 5/2002 | Hsu | B62K 3/002 280/87.041 |
| 6,481,913 B2 * | 11/2002 | Chen | B62K 3/002 16/900 |
| 6,805,368 B1 * | 10/2004 | Chen | B62K 3/002 280/87.041 |
| 7,011,319 B2 * | 3/2006 | Lu | B62K 15/006 280/87.041 |
| 7,407,172 B2 * | 8/2008 | Ka Ming | B62K 3/002 280/87.041 |
| 7,419,171 B1 * | 9/2008 | Ka Ming | B62K 3/002 280/87.041 |
| 8,079,613 B2 * | 12/2011 | Williams | B60D 1/52 280/491.5 |
| 8,113,525 B2 * | 2/2012 | Lin | B62K 3/002 280/87.041 |
| 8,672,336 B2 * | 3/2014 | Turner | B62K 3/002 280/278 |
| 2001/0030405 A1 * | 10/2001 | Wu | B62K 3/002 280/87.041 |
| 2002/0017768 A1 * | 2/2002 | Nardone | B62K 3/002 280/87.041 |
| 2002/0050696 A1 * | 5/2002 | Lan | B62K 15/006 280/87.041 |
| 2002/0140193 A1 * | 10/2002 | Chai | B62K 15/006 280/87.041 |
| 2002/0145264 A1 * | 10/2002 | Hung | B62K 15/006 280/87.041 |
| 2003/0001351 A1 * | 1/2003 | Schauble | B62K 3/002 280/87.05 |
| 2003/0067132 A1 * | 4/2003 | Lin | B62K 3/002 280/87.041 |
| 2005/0006866 A1 * | 1/2005 | Chen | B62K 15/00 280/87.05 |
| 2014/0356050 A1 * | 12/2014 | Yu | B62K 19/18 403/110 |
| 2015/0042053 A1 * | 2/2015 | Berndorfer | B62K 3/002 280/7.1 |
| 2015/0210340 A1 * | 7/2015 | Wang | B62K 15/006 280/278 |

* cited by examiner

FOLDING KICK SCOOTER

BACKGROUND OF THE INVENTION

1. Field of the Invention

The invention relates to kick scooters and more particularly to a folding kick scooter having improved characteristics.

2. Description of Related Art

A conventional folding kick scooter includes a handlebar and a head tube and they fold when a quick release latch is opened.

However, the folding operation is inconvenient because a rider has to bend the waist. Further, riding safety is low due to weak structural strength.

Thus, the need for improvement still exists.

SUMMARY OF THE INVENTION

It is therefore one object of the invention to provide a folding kick scooter comprising a head tube; a handlebar configured to partially slide within the head tube; a quick release clamp disposed on a top end of the head tube and including a lever; a fork having a top end secured to the head tube; a front wheel rotatably secured to a bottom end of the fork; a neck having a front end secured to the head tube and including two opposite slot members; a footboard having an upwardly bent front portion pivotably secured to the neck and including two front, opposite cavities; a rear wheel rotatably secured to a rear end of the footboard; an arc shaped brake member disposed at a rear portion of the footboard; a lock device including a seat disposed in the neck, the seat having a through hole, and a spring biased pin disposed through the slot members to have two ends releasably anchored in the opposite cavities respectively; a cable having a first end secured to the lever and a second end passing through the neck and the through hole of the seat to secure to the pin; a brake member including a rear projection, a hole perpendicular to the projection, and a slot element communicating with the hole; and a lever fastening device including a main body having a through hole, a spring biased rod disposed in the hole of the brake member and having a hole member, and a stem partially disposed through the through hole of the main body, the slot element, and the hole member of the rod to moveably secure the lever fastening device to the brake member; wherein in response to pulling the cable by manipulating the lever, the pin is configured to clear out of the cavities to cause the lever to contact the lever fastening device.

The above and other objects, features and advantages of the invention will become apparent from the following detailed description taken with the accompanying drawings.

DETAILED DESCRIPTION OF THE INVENTION

Figure 1:
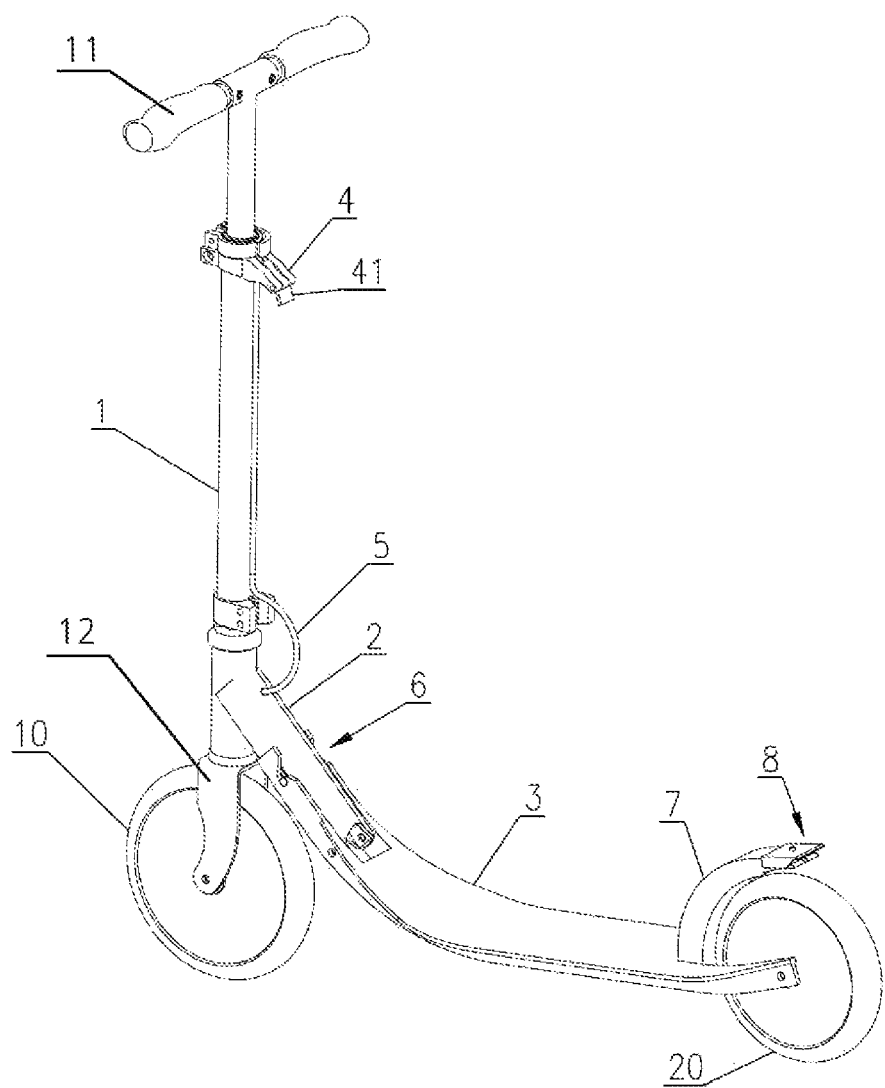
FIG. 1 is a perspective view of a folding kick scooter according to the invention.
Figure 2:
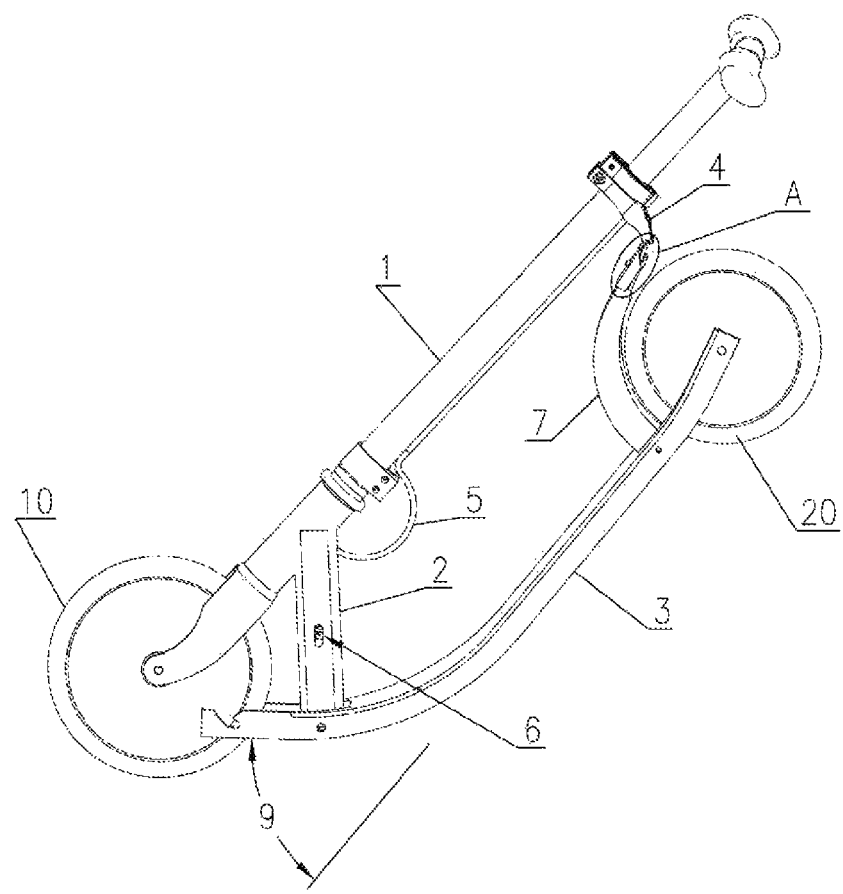
FIG. 2 is a side view of the kick scooter after folding.
Figure 3:
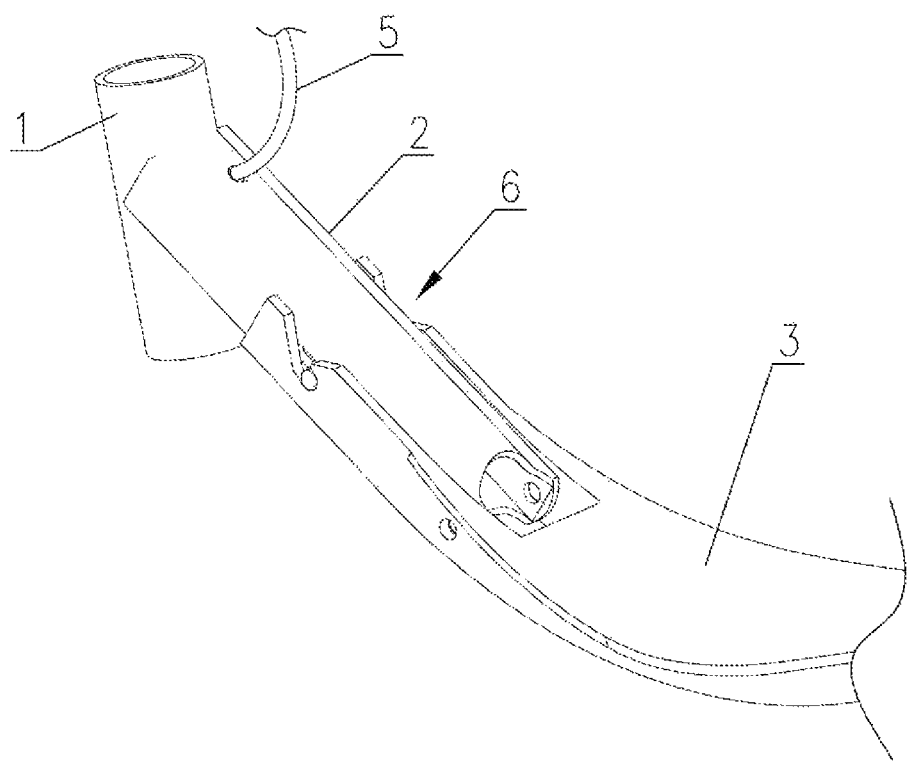
FIG. 3 is a perspective view of the lock device of a first preferred embodiment and adjacent components.
Figure 4:
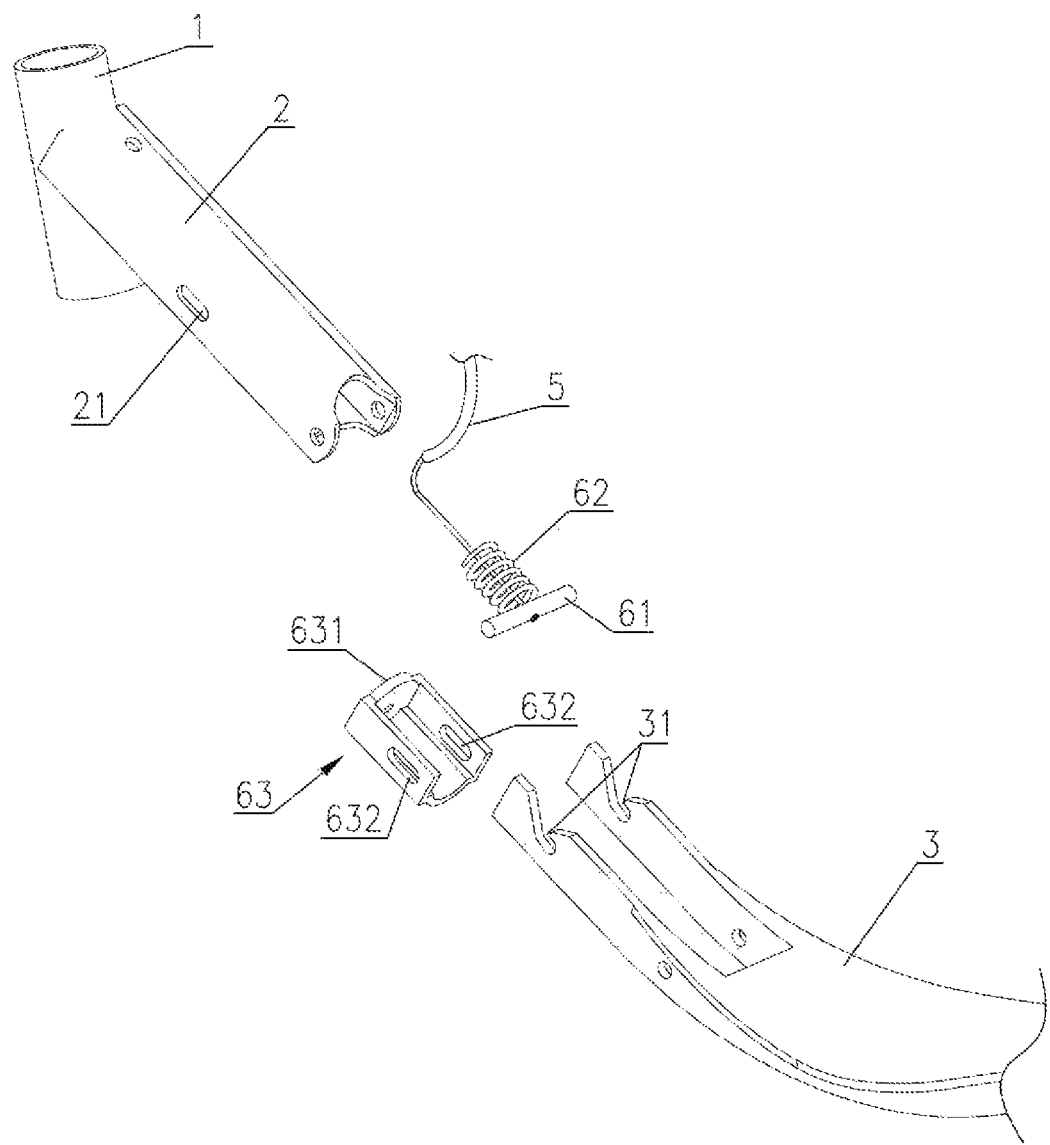
FIG. 4 is an exploded view of FIG. 3.
Figure 5:
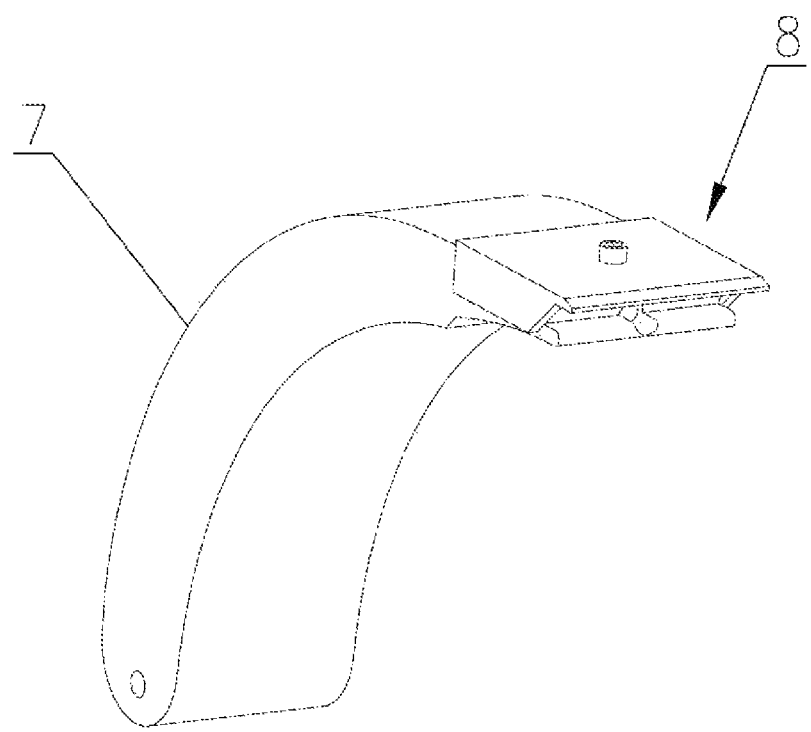
FIG. 5 is a perspective view of the brake member and the lever fastening device.
Figure 6:
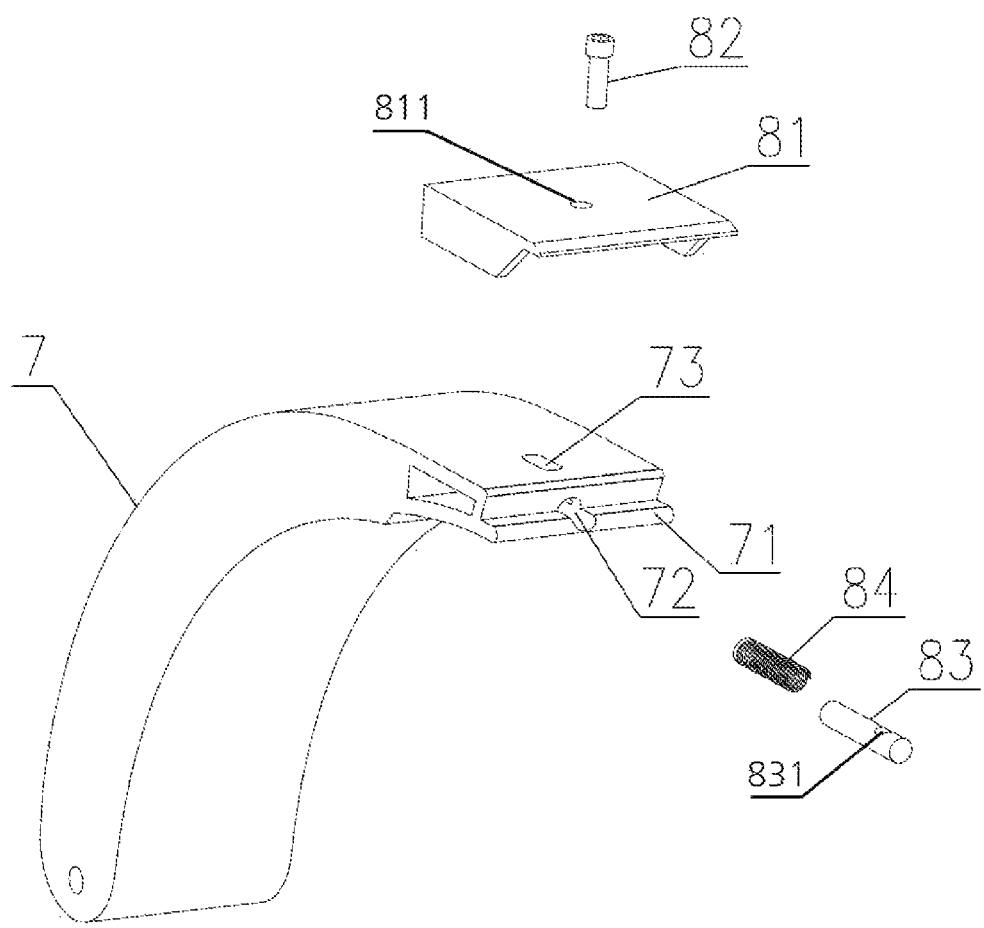
FIG. 6 is an exploded view of FIG. 5.
Figure 7:
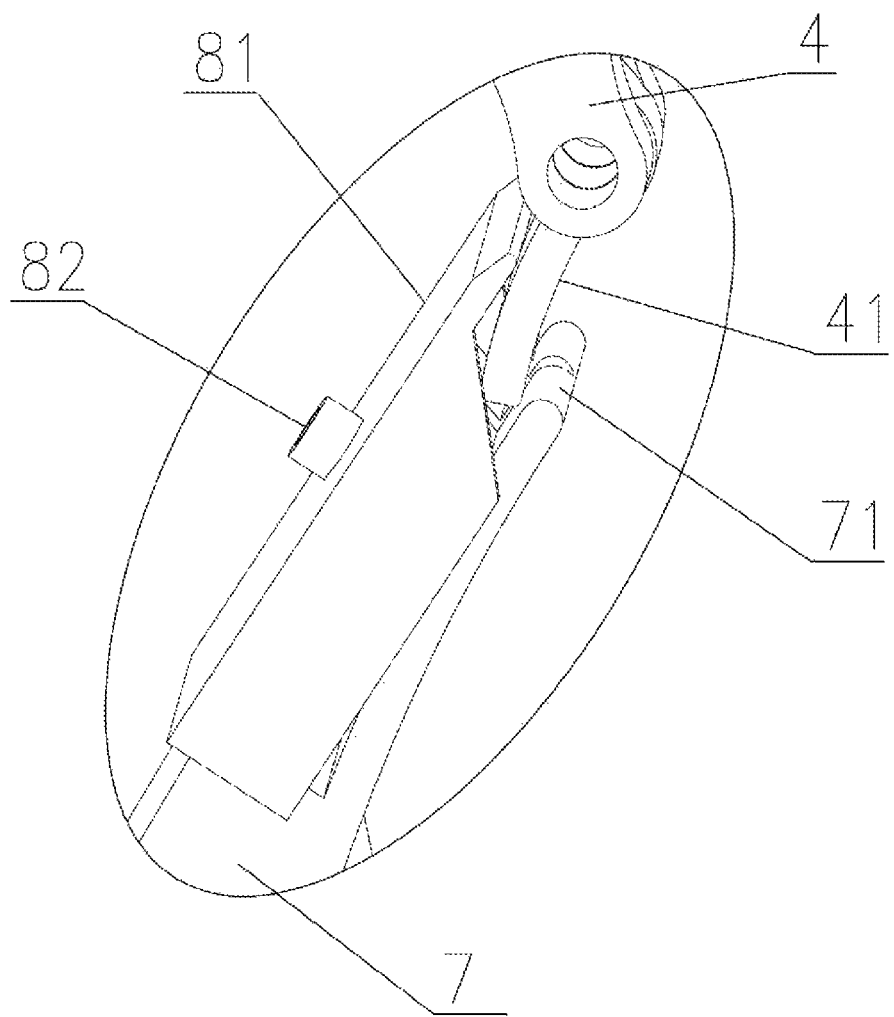
FIG. 7 is a detailed view of the area in an oval A of FIG. 2.

Referring to FIGS. 1 to 7, a folding kick scooter in accordance with the invention comprises the following components as discussed in detail below.

A T-shaped handlebar 11 is capable of partially sliding within a head tube 1. A quick release clamp 4 is mounted on a top end of the head tube 1 and includes a lever 41. A fork 12 has a top end secured to the head tube 1. A front wheel 10 is rotatably secured to a bottom end of the fork 12. A neck 2 has a front end secured to the head tube 1 and a rear end pivotably secured to a front bent portion of a footboard 3. The bent portion of the footboard 3 is at an angle 9 of 35 degrees to 65 degrees with respect to the main portion thereof. A rear wheel 20 is rotatably secured to a rear end of the footboard 3. An arc shaped brake member 7 is provided at a rear portion of the footboard 3 and covers a portion of the rear wheel 20.

A lock device 6 includes a pin 61, a helical spring 62, and a hollow seat 63 disposed in the neck 2 and including a front through hole 631 and two opposite side slots 632. The pin 61 is disposed through two opposite slot members 21 of the neck 2 and the side slots 632 to have two ends releasably anchored in two opposite cavities 31 at a front end of the footboard 3 respectively. An end of a cable (e.g., steel cable) 5 passes through the neck 2 and the through hole 631 to secure to the pin 61. A helical spring 62 is put on the end of the cable 5 and fastened in the neck 2. The other end of the cable 5 is secured to the lever 41. The pin 61 may clear out of the cavities 31 by pulling the cable 5 by manipulating the lever 41 in a folding operation.

The brake member 7 includes a rear projection 71, a hole 72 perpendicular to the projection 71, and a slot element 73 communicating with the hole 72. A lever fastening device 8 includes a main body 81 having a through hole 811, a rod 83 disposed in the hole 72 and having a hole 831, a helical spring 84 disposed in the hole 72 and biasing against an end of the rod 83, and a stem 82 partially disposed through the hole 811, the slot element 73, and the hole 831 to moveably secure the lever fastening device 8 to the brake member 7.

After the folding, the lever 41 is in close proximity to (or contacts) the lever fastening device 8 due to the upwardly bent front portion of the footboard 3. Then, a rider may move the stem 82 to adjust a rear opening defined between the brake member 7 and the lever fastening device 8 to insert the lever 41 into the opening. Finally, the rider may move the stem 82 to press the main body 81 against the lever 41 to fasten the lever 41. As a result, the rider may easily carry the folded kick scooter.

Figure 8:
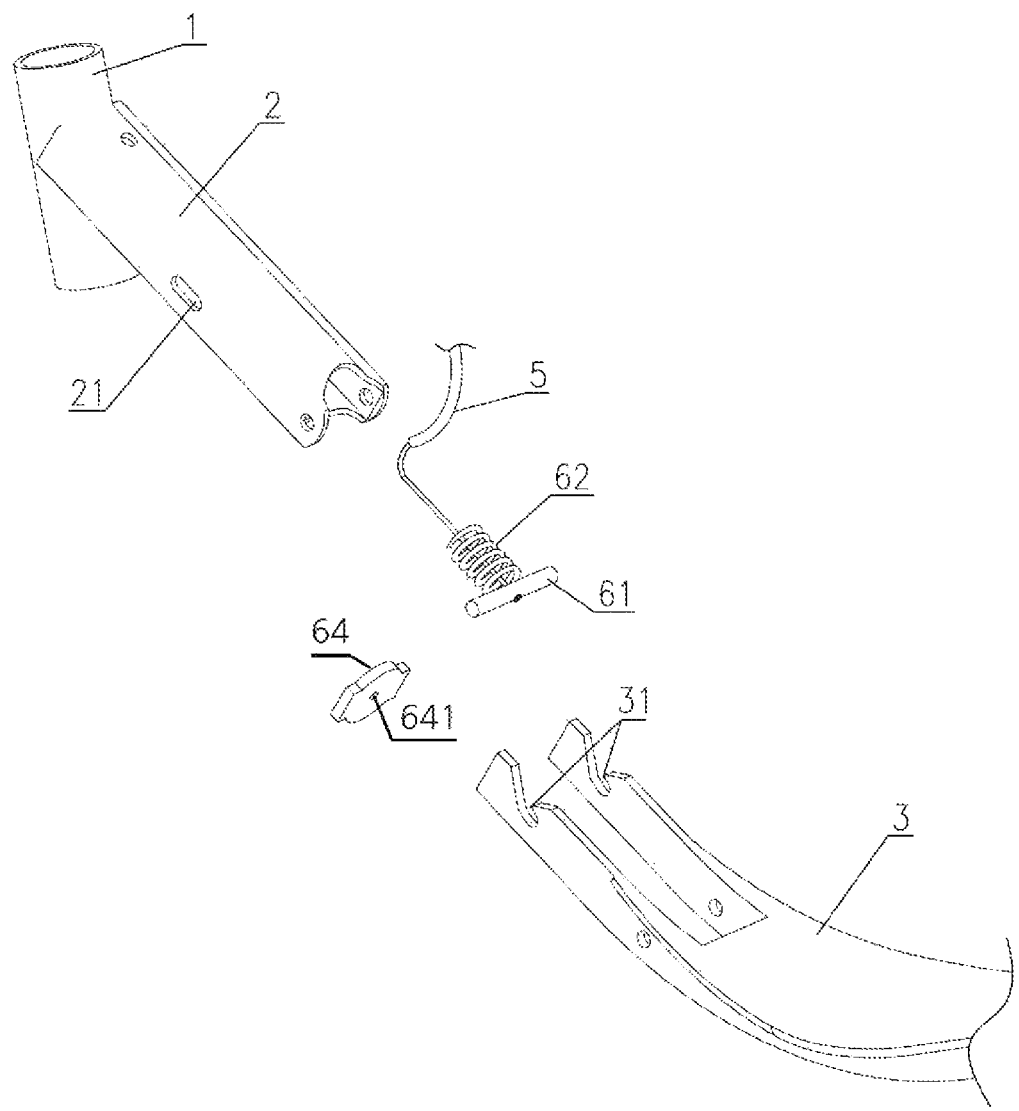
FIG. 8 is an exploded view of the lock device of a second preferred embodiment and adjacent components.

Referring to FIG. 8, a lock device of a second preferred embodiment is shown. The lock device is implemented as a plate member 64 having a through hole 641. The pin 61 is disposed through the opposite slot members 21 of the neck 2 to have two ends releasably anchored in the opposite cavities 31 of the footboard 3 respectively. An end of the cable 5 passes through the neck 2 and the hole 641 to secure to the pin 61.

While the invention has been described in terms of preferred embodiments, those skilled in the art will recognize that the invention can be practiced with modifications within the spirit and scope of the appended claims.

What is claimed is:

1. A folding kick scooter comprising:
a head tube;
a handlebar configured to partially slide within the head tube;
a quick release clamp disposed on a top end of the head tube and including a lever;

a fork having a top end secured to the head tube;
a front wheel rotatably secured to a bottom end of the fork;
a neck having a front end secured to the head tube and including two opposite slot members;
a footboard having an upwardly bent front portion pivotably secured to the neck and including two front, opposite cavities;
a rear wheel rotatably secured to a rear end of the footboard;
an arc shaped brake member disposed at a rear portion of the footboard;
a lock device including a seat disposed in the neck, the seat having a through hole, and a spring biased pin disposed through the slot members to have two ends releasably anchored in the opposite cavities respectively;
a cable having a first end secured to the lever and a second end passing through the neck and the through hole of the seat to secure to the pin;
a brake member including a rear projection, a hole perpendicular to the projection, and a slot element communicating with the hole; and
a lever fastening device including a main body having a through hole, a spring biased rod disposed in the hole of the brake member and having a hole member, and a stem partially disposed through the through hole of the main body, the slot element, and the hole member of the rod to moveably secure the lever fastening device to the brake member;
wherein in response to pulling the cable by manipulating the lever, the pin is configured to clear out of the cavities to cause the lever to contact the lever fastening device.

2. The folding kick scooter of claim 1, wherein the seat further comprises two opposite side slots aligned with the slot members, and wherein the pin passes through the side slots.

* * * * *